United States Patent

Yamamoto et al.

[15] 3,673,243
[45] June 27, 1972

[54] NOVEL PROCESS FOR PRODUCING O-ANILINOPHENYLALIPHATIC ACID DERIVATIVES

[72] Inventors: Hisao Yamamoto, Nishinomiya-shi; Atsuko Hirohashi, Ashiya-shi; Takahiro Izumi, Takarazuka-shi; Masao Koshiba, Minoo-shi, all of Japan

[73] Assignee: Sumitomo Chemical Company, Ltd., Osaka, Japan

[22] Filed: May 2, 1969

[21] Appl. No.: 821,494

[30] Foreign Application Priority Data

May 8, 1968 Japan....................................43/31141
May 13, 1968 Japan....................................43/32406
May 15, 1968 Japan....................................43/33113

[52] U.S. Cl. ....................260/518 R, 260/471 R, 260/518 A, 260/519, 424/309, 424/319
[51] Int. Cl........................................................C07c 101/44
[58] Field of Search................260/518 R, 518 A, 519, 471 R

[56] References Cited

UNITED STATES PATENTS 3,397,211  8/1968  Gal........................260/518

OTHER PUBLICATIONS

Finar; I. L., Organic Chemistry, Vol. I, Pub. by R. Clay & Co., Great Britian (Q 251F56)–1963, pages 677 & 689 relied on.

Primary Examiner—Lewis Gotts
Assistant Examiner—L. Arnold Thaxton
Attorney—Stevens, Davis, Miller & Mosher

[57] ABSTRACT o-Anilinophenylaliphatic acid derivatives being excellent in anti-inflammatory activity and extremely low in toxicity and having the formula,

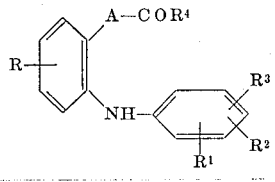

wherein A is vinylene, ethylene, etc.; R, $R^1$, $R^2$, and $R^3$ is hydrogen, halogen or lower alkyl, halogen-substituted lower alkyl or lower alkoxy; and $R^4$ is hydroxyl or lower alkoxy, are produced advantageously by contacting carbostyril derivative of the formula,

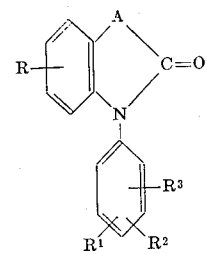

where A, R, $R^1$, $R^2$ and $R^3$ are as defined above, with compound of the formula, $R^4H$, wherein $R^4$ is as defined above, or contacting benzenecarbonyl derivative of the formula,

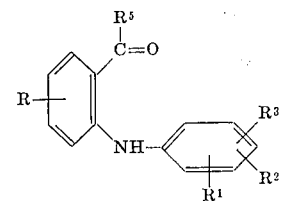

wherein R, $R^1$, $R^2$ and $R^3$ are as defined above, and $R^5$ is hydrogen or lower alkyl in the presence of an alkali, with triphenyl-alkoxycarbonylmethylphosphonium halide of the formula,

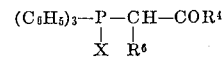

wherein $R^4$ is as defined above; $R^6$ is hydrogen or lower alkyl; and X is halogen, and if necessary, further contacting the obtained o-cinnamic acid derivative with hydrogen.

4 Claims, No Drawings

NOVEL PROCESS FOR PRODUCING O-ANILINOPHENYLALIPHATIC ACID DERIVATIVES

The present invention relates to a novel process for producing o-anilinophenylaliphatic acid derivatives and their salts. More particularly the present invention pertains to a novel process for producing o-anilinophenylaliphatic acid derivatives, and their salts, represented by the formula,

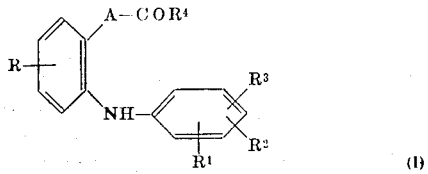

wherein A signifies an unsubstituted or $C_1$–$C_3$ alkyl-substituted vinylene carbon chain or an unsubstituted or $C_1$–$C_3$ alkyl-substituted ethylene carbon chain; R, $R^1$, $R_2$ and $R^3$ signify respectively a hydrogen atom or a halogen atom, or a $C_1$–$C_3$ alkyl group, a halogen-substituted $C_1$–$C_3$ alkyl group or a $C_1$–$C_3$ alkoxy group; and $R^4$ signifies a hydroxyl group or a $C_1$–$C_4$ alkoxy group.

Further, the present invention is concerned with a novel o-anilinophenylaliphatic acid derivatives represented by the formula,

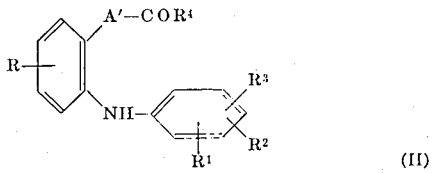

wherein A' signifies an unsubstituted or $C_1$–$C_3$ alkyl-substituted ethylene carbon chain; R, $R^1$, $R^2$ and $R^3$ have the same meanings as defined in the formula (I).

The novel compounds mentioned in the present invention do not only indicate excellent anti-inflammatory action and antipyretic activity, but also possess extremely low toxicity.

A process for producing an o-anilinocinnamic acid derivative has heretofore been described (Netherland Patent application 67, 13630). According to this Netherland Patent application, an o-anilinocinnamic acid derivative has been prepared by reacting an o-anilinobenzaldehyde with acetic anhydride (Perkin Reaction) or with alkyl malonate (Knoevenagel or Doebner Reaction). However, according to Perkin, Knoevenagel or Doebner Reaction, the aimed o-anilinocinnamic acid derivative can be obtained in extremely low yield, or cannot be obtained at all.

Contrary to the known methods, the present inventors found a novel process for producing o-anilinophenylaliphatic acid derivative of the formula (I) using triphenylcarboalkoxy-methylphosphonium halide, which process represents a significant improvement thereover from the commercial point of view.

One object of the present invention is to provide a novel and economically advantageous process for producing o-anilinophenylaliphatic acid derivatives of the Formula (I), which are excellent in anti-inflammatory activity and extremely low in toxicity.

Another object of the present invention is to provide novel o-anilinophenylaliphatic acid derivatives, which are excellent in anti-inflammatory activity and extremely low in toxicity.

A further object of the present invention is to provide a pharmaceutical composition containing such o-anilinophenylaliphatic acid derivatives as an active ingredient.

Other objects of the present invention will be apparent from the following description.

In order to accomplish these objects, the present invention provides a novel process for producing o-anilinophenylaliphatic acid derivatives of the above Formula (I) and their salts, which comprises contacting a carbostyryl compound represented by the formula,

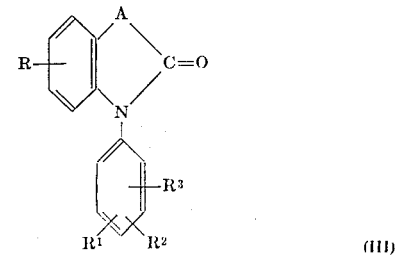

wherein A, R, $R^1$, $R^2$ and $R^3$ signify respectively the same meanings as defined in the Formula (I), with a compound represented by the formula, $$R^4H \qquad (IV)$$

wherein $R^4$ signifies the same meaning as defined above, in the presence of a base or an acid, or contacting a benzenecarbonyl derivative represented by the formula,

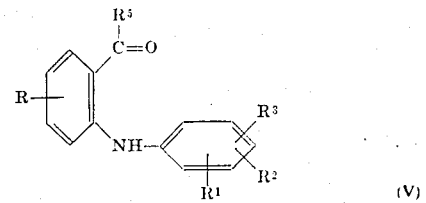

wherein R, $R^1$, $R^2$ and $R^3$ signify respectively the same meanings as defined in the Formula (I); and $R^5$ signifies a hydrogen atom or a $C_1$–$C_3$ alkyl group, with a triphenylalkoxycarbonylmethyl-phosphonium halide represented by the formula,

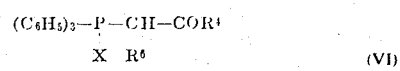

wherein $R^4$ signifies the same meaning as defined above; $R^6$ signifies a hydrogen atom or a $C_1$–$C_3$ alkyl group; and X signifies a halogen atom, in the presence of an alkali, and if necessary, further contacting the obtained o-anilinophenylaliphatic acid derivative of the Formula (I), wherein the symbol A is an unsubstituted or $C_1$–$C_3$ alkyl-substituted vinylene carbon chain, with hydrogen.

Further the present invention provides novel o-anilinophenylaliphatic acid derivatives of the Formula (II).

o-Anilinophenylaliphatic acid derivatives of the Formula (II) of the present invention have never been disclosed in any literature and are novel compounds which are first produced by the present inventors.

According to the novel process of the present invention, o-anilinophenylaliphatic acid derivatives of the Formula (I) are produced by reacting a carbostyryl derivative of the Formula (III) with a compound of the Formula (IV), for example water, an alcohol or the like. The reaction is conducted in the presence of a base or an acid. Examples of the base used in the present invention include a conventional base such as caustic alkali, alkali metal, alkali carbonate or the like and those of the acid used in the present invention include a conventional inorganic acid such as hydrochloric acid, sulfuric acid or the like.

The reaction is carried out at a temperature within the range between 0° and 150° C, and if desired, under pressure. In the present reaction, although employment of a solvent is not critical, however it is preferable to employ a suitable solvent. Examples of the solvent include water, alcohols such as methanol or ethanol or usual inert organic solvents.

According to the present process, there are produced such o-anilinophenylaliphatic acid derivatives and salts thereof as shown below:

β-(o-Anilinophenyl)propionic acid
β-{o-(p'-Toluidino)phenyl}propionic acid

β-Methyl-β-{o-(p'-toluidino)phenyl}propionic acid o-(p'-Toluidino)cinnamic acid
β-Methyl-o-(p'-toluidino)cinnamic acid o-(2',3'-Xylidino)cinnamic acid
Ethyl o-(2',3'-Xylidino)cinnamate
β-Methyl-o-(2',3'-Xylidino)cinnamic acid o-(o'-Trifluoromethylanilino)cinnamic acid
Methyl o-(o'-trifluoromethylanilino)cinnamate
β-{o-(m'-Toluidino)phenyl}propionic acid
Methyl β-{o-(p'-toluidino)phenyl}propionate
Ethyl β-(o-anilinophenyl)propionate
β-{o-(o'-Toluidino)phenyl}propionic acid
β-Methyl-β-{o-(2',3'-xylidino)phenyl} propionic acid
β-{o-(2',3'-Xylidino)phenyl} propionic acid
α-Methyl-β-{o-(2',3'-xylidino)phenyl} propionic acid
Methyl β-{o-(2',3'-xylidino)phenyl}propionate
β-Ethyl-β-{o-(2',3'-xylidino)phenyl} propionic acid
Ethyl β-{o-(2',3'-xylidino)phenyl}propionate
β-{o-(p'-Anisidino)phenyl}propionic acid
β-{o-(o'-Chloroanilino)phenyl}propionic acid
Ethyl β-{o-(p'-chloroanilino)phenyl}propionate
β-{o-(p'-Bromoanilino)phenyl}propionic acid
β-{o-(m'-Trifluoromethylanilino)phenyl}propionic acid
Ethyl β-{o-(m'-trifluoromethylanilino)phenyl}propionate
β-{5-Methyl-2-(p'-toluidino)phenyl}propionic acid
β-{5-Methoxy-2-(p'-toluidino)phenyl}propionic acid
β-{5-Chloro-2-(p'-toluidino)phenyl}propionic acid
α-Methyl-β-{o-(o'-toluidino)phenyl} propionic acid
α-Methyl-β-{o-(o'-toluidino)phenyl} butyric acid
and sodium salts, potassium salts, calcium salts, aluminum salts of the above-mentioned free acids.

A carbostyryl derivative of the Formula (III), which is used as a starting material in this process, can be readily prepared by reacting a corresponding o-anilinobenzaldehyde derivative with an α-halogenoacetic acid or a malonic acid derivative.

Further, in the present invention, an o-anilinophenylaliphatic acid derivative of the Formula (I) can also be produced by reacting a benzenecarbonyl derivative of the Formula (V) with a triphenylalkoxycarbonylmethylphosphonium halide of the Formula (VI) in the presence of an alkali, and if necessary, hydrogenating the obtained o-anilinophenylaliphatic acid derivative wherein symbol A is an unsubstituted or $C_1$-$C_3$ alkyl-substituted vinylene carbon chain.

In carrying out the present process, a treatment of triphenylcarboalkoxymethylphosphonium halide of the Formula (VI) with an alkali causes production of the corresponding triphenylcarboalkoxymethylphosphorane derivative, which reacts with a benzenecarbonyl derivative of the Formula (V) to give the corresponding o-anilinophenylaliphatic acid derivative of the Formula (I) in good yield. An ester derivative of the Formula (I), if necessary, can be hydrolyzed to give the corresponding free carboxylic acid derivative.

Examples of the alkali used in the treatment include phenyl lithium, sodium amide, lithium amide, sodium hydride, lithium hydride, sodium alcoholate, alkali hydroxide and alkali carbonate.

In the process of the present invention, the reaction of a benzenecarbonyl derivative of the Formula (V) with a triphenylalkoxycarbonylmethylphosphonium halide derivative can be carried out even in the absence of a solvent, but in general it is preferable to use a solvent. Examples of the solvent used include conventional and inert organic solvents such as diethyl ether, benzene, toluene, xylene, tetrahydrofuran, and dichloromethane and organic solvent such as alcohols, N,N-dimethylformamide and dimethyl sulfoxide and water. The reaction is carried out at a temperature within the range between −30° and 150° C., preferably between 0° and 100° C. The reaction usually requires about 2–24 hours.

The following o-anilinophenylaliphatic acid derivatives can be easily obtained by the process mentioned above.
o-Anilinocinnamic acid
Ethyl o-anilinocinnamate
Methyl o-anilinocinnamate
o-(o'-Toluidino)cinnamic acid
o-(2',3'-Xylidino)cinnamic acid
Ethyl o-(2',3'-Xylidino)cinnamate
o-(p'-Anisidino)cinnamic acid
o-(o'-Anisidino)cinnamic acid
o-(o'-Chloroanilino)cinnamic acid
o-(m'-Chloroanilino)cinnamic acid
o-(p'-Chloroanilino)cinnamic acid
Ethyl o-(p'-chloroanilino)cinnamate
o-(p'-Bromoanilino)cinnamic acid
o-(m'-Trifluoromethylanilino)-cinnamic acid
Methyl o-(m'-trifluoromethylanilino)cinnamate
5-Methyl-2-(p'-toluidino)cinnamic acid
5-Methoxy-2-(p'-toluidino)cinnamic acid
5-Chloro-2-(p'-toluidino)cinnamic acid
α-Methyl-o-(2',3'-xylidino)cinnamic acid
β-Methyl-o-(2',3'-xylidino)cinnamic acid
and sodium salts, potassium salts, and aluminum salts thereof.

Further, these o-anilinocinnamic acid derivatives obtained according to methods as mentioned above can be reduced to the corresponding o-anilinophenylaliphatic acid derivative of the Formula (II).

This reduction is performed by catalytic hydrogenation or employment of nascent hydrogen or di-imine. The catalytic hydrogenation is carried out by contacting an o-anilinocinnamic acid derivative with hydrogen in the presence of a catalyst. Examples of the catalyst used in the catalytic hydrogenation of the present invention include platinum catalyst, palladium catalyst, ruthenium catalyst, sodium catalyst, copper catalyst, nickel catalyst and the like. The present hydrogenation is carried out under atmospheric pressure, but it can be used to apply pressure.

Sodium-alcohol, sodium-liquid ammonia, selenium or sodium amalgam are employed in order to generate nascent hydrogen.

Further, electrolytic reduction is available in the present invention.

Reduction with di-imine is carried out in the presence of an alkali or by heating.

This reaction is carried out even in the absence of a solvent, but preferably in the presence of an appropriate solvent such as methanol, ethanol, ethyleneglycol, benzene, ether, tetrahydrofuran, cyclohexane, dioxane, acetic acid, acetic anhydride, ethyl acetate, water and the like.

According to this reduction, the following o-anilinophenylaliphatic acid derivatives are prepared;
β-(o-Anilinophenyl)propionic acid
β-{o-(p'-Toluidino)phenyl} propionic acid
β-{o-(m'-Toluidino)phenyl} propionic acid
Methyl β-{o-(p'-toludidino)phenyl} propionate
Ethyl β-(o-anilinophenyl)propionate
β-{o-(o'-Toluidino)phenyl} propionic acid
β-{o-(2',3'-Xylidino)phenyl} propionic acid
Methyl β-{o-(2',3'-xylidino)phenyl} propionate
Ethyl β-{o-(2',3'-xylidino)phenyl} propionate
β-{o-(p'-Anisidino)phenyl} propionic acid
β-{o-(o'-Chloroanilino)phenyl}propionic acid
Ethyl β-{o-(p'-Chloroanilino)phenyl}propionate
β-{o-(p'-bromoanilino)phenyl} propionic acid
β-{o-(m'-trifluoromethylanilino)phenyl} propionic acid
Ethyl β-{o-(m'-trifluoromethylanilino)phenyl} propionate
β-{5-Methyl-2-(p'-toluidino)phenyl} propionic acid
β-{5-Methoxy-2-(p'-toluidino)phenyl} propionic acid
β-{5-Chloro-2-(p'-toluidino)phenyl} propionic acid
α-Methyl-β-{o-(o'-toluidino)phenyl} propionic acid
α-Methyl-β-{o-(o'-toluidino)phenyl} butyric acid The present invention include sodium salts, potassium salts, calcium salts or aluminum salts of the above-mentioned free acids.

The present compounds of the Formula (II) indicate excellent anti-inflammatory action and antipyretic activity, but possess the minimum toxicity. For example, β-{o-(2',3'-xylidino)phenyl} propionic acid and β-{o-(p'-toluidino)phenyl}-propionic acid are remarkably low in toxicity, and when over 1,000 mg/kg of these compounds are orally administrated to rats or mice, they do not show any toxic symptom and occult bleeding is negative in feces thereof. Nevertheless, the activities of these compounds are higher than or equal to those of N-(2',3'-xylyl)-o-anthranilic acid (Mefenamic acid).

Anti-inflammatory activity of these compounds was tested in carrageenin-induced foot edema of rats according to a method discribed by C. A. Winter, E. A. Risley and G. M. Nuss; Proc. Exptl. Biol. Med., 111, 544 (1962). Test materials were suspended in 0.5 percent solution of sodium carboxymethylcellulose and given a stomach tube 1 hr. before the injection of carrageenin. For toxicity test of these compounds, blood in feces was determined the day after the carrageenin test and body weight of each rat was recorded daily for the following 4 days. These results expressed as percentage of the inhibition in a following table.

| Compound | Dose (mg./kg.) | Inhibition of edema (percent) | Toxicity |
|---|---|---|---|
| β-[o-(2',3'-xylidino)-phenyl]-propionic acid. | 400 | 39.1 | No blood in feces; normal body weight gain. |
| β-[o-(p'-Toluidino)-phenyl]-propionic acid. | 400 | 32.8 | Do. |

Therefore, the therapeutic ratios of the compounds of the present invention are greater than these marketing drugs, and these present compounds of the Formula (II) are markedly valuable in a practical usage.

Accordingly, the present invention further provides a pharmaceutical composition consisting essentially of an effective amount of o-anilinophenylaliphatic acid derivatives of the Formula (II) and a pharmaceutically acceptable carrier. An oral effective dose is generally 400–800 mg/day/human for primary inflammation syndromes.

Following examples are given not to limit the present invention but only to intend to illustrate the present invention more particularly.

EXAMPLE 1

A mixture of N-(p'-methylphenyl)-3,4-dihydrocarbostyryl (0.2 g) and an aqueous solution of potassium hydroxide (1 g) was heated under reflux for 10–15 hours. Thereafter the aqueous layer was treated with active charcoal, acidified with hydrochloric acid. A precipitate produced was collected by filtration and washed with water to give β-{o-(p'-toluidino)-phenyl}propionic acid, m.p. 103°–104° C.

Recrystallization from ethanol-water gave colorless needles, m.p. 105°–107.5° C.

According to a manner similar to that mentioned in Example 1, following compounds were obtained:

Ethyl o-(p'-toluidino)cinnamate  m.p. 114.5°–115.5°C.
Ethyl o-(2',3'-xylidino)cinnamate  m.p. 85.5°–86°C.
o-(p'-Toluidino)cinnamic acid  m.p. 184.5°–185°C.
o-(2',3'-Xylidino)cinnamic acid  m.p. 192.5°–193.5°C.
β-{o-(2',3'-Xylidino)phenyl} propionic acid  m.p. 97°–98°C.
o-(2'-Chloro-3'-trifluoromethylanilino)-cinnamic acid  m.p. 199°–200°C.
Ethyl o-(3'-trifluoromethyl-anilino)-cinnamate  m.p. 79°–82°C.
2-Anilino-4-chlorocinnamic acid  m.p. 230°–232°C.

EXAMPLE 2

After being washed with n-hexane and dried in a stream of nitrogen, 0.22 g of sodium hydride was heated with 8 ml. of dimethylsulfoxide at 75°–80° C. for a half hour. To the reaction mixture was added dropwise a solution of 2.3 g of triphenyl-carboethoxymethylphosphonium bromide in 6 ml. of dimethylsulfoxide under cooling with ice. After the addition, the mixture was allowed to stand at a room temperature for 1 hour. A solution of 1 g of o-(p'-toluidino)-benzaldehyde in 4 ml. of dimethylsulfoxide was added to the mixture, and the mixture was left at a room temperature overnight. The mixture was poured into water and extracted with ether. The ethereal layer was dried, the solvent was concentrated and column-chromatographed on a silica gel, and eluted with benzene to give 1.2 g (yield 90 percent) of ethyl o-(p'-toluidino)cinnamate. Recrystallization from cyclohexane gave 1.1 g of yellow needles having m.p. 114.5°–115.5°C.

According to the procedure similar to the method described in Example 2, following compounds were obtained in good yields.

Ethyl o-(2',3'-xylidino)cinnamate  m.p. 85.5°–86°C, yield 87.5%
Ethyl o-(2'-chloro-5'-trifluoromethyl-anilino)cinnamate  m.p. 79°–82°C., yield 84.3%
Ethyl o-(2',6'-dichloro-anilino)-cinnamate  m.p. 107°–109°C, yield 82.1%
Ethyl o-(2',6'-dichloro-3'-methyl-anilino)cinnamate  m.p. 95°–97°C., yield 76.5%
Ethyl 2-(2',6'-dichloroanilino)-4-chlorocinnamate  m.p. 98°–100°C., yield 85.3%
Ethyl 2-(2',6'-dichloroanilino)-4-methoxycinnamate  m.p. 110°–113°C, yield 83.2%
Ethyl o-(2',5'-xylidino)cinnamate  m.p. 101°–102°C, yield 90.1%

EXAMPLE 3

A mixture of 1.7 g of ethyl o-(p'-toluidino)cinnamate and potassium hydroxide (1.2 equivalent amount) in ethanol was heated under reflux for 30 minutes. Thereafter ethanol was distilled off. The resultant residue was dissolved in water and acidified with hydrochloric acid, and the precipitate was collected by filtration, washed with water and dried to give 1.3 g (yield 83 percent) of o-(p'-toluidino)cinnamic acid. Recrystallization from ethanol-water gave yellow needles having m.p. 184.5°–185° C. (decomposition).

According to the method similar to that mentioned in Example 3, following compounds were prepared.

o-(2',3'-Xylidino)cinnamic acid  m.p. 192.5°–193.5°C., yield 90%
o-(2',6'-Dichloro-3'-methylanilino)-cinnamic acid  m.p. 217°–219°C., yield 88%
o-(2',6'-Dichloroanilino)cinnamic acid  m.p. 222°–223°C., yield 92%
o-(m'-Trifluoromethylanilino)cinnamic acid  m.p. 163°–165°C., yield 91%
o-(2',5'-Xylidino)cinnamic acid  m.p. 171°–172°C., Yield 92%
o-(2'-Chloro-5'-trifluoromethylanilino)-cinnamic acid  m.p. 199°–200°C., yield 86%

EXAMPLE 4

A solution of 0.3 g of o-(p'-toluidino)cinnamic acid in 10 ml. of ethanol was shaken in a stream of hydrogen in the presence of platinium oxide at a room temperature under an atmospheric pressure. After completion of the reaction, the solvent was removed to a residue, which is crystallized on treatment with petroleum ether. Recrystallization from methanol-water gave colorless needles of β-{o-(p'-toluidino)-phenyl}propionic acid having m.p. 105°–107.5°C.

According to a procedure similar to that of Example 4, colorless needles of β-{o-(2',3'-xylidino)phenyl} propionic acid, m.p. 97°–98° C., were prepared from o-(2',3'-xylidino)cinnamic acid.

What we claim is:

1. A process for producing an o-anilinophenylaliphatic acid derivative represented by the formula

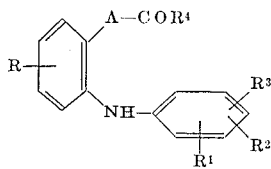

wherein A' signifies an unsubstituted or $C_1$–$C_3$ alkyl-substituted vinylene carbon chain; R, $R^1$, $R^2$ and $R^3$ signify respectively a hydrogen atom, a halogen atom or a $C_1$–$C_3$ alkyl, a halogen-substituted $C_1$–$C_3$ alkyl or a $C_1$–$C_3$ alkoxy group; and $R^4$ signifies hydroxyl or a $C_1$–$C_4$ alkoxy group, which comprises reacting a benzenecarbonyl derivative represented by the formula

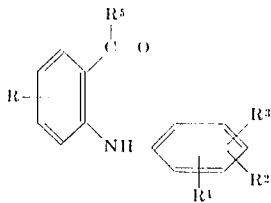

wherein R, $R^1$, $R^2$ and $R^3$ signify respectively the same meanings as defined above; and $R^5$ signifies hydrogen atom or a $C_1$–$C_3$ alkyl group, with a triphenylalkoxycarbonylmethylphosphonium halide represented by the formula

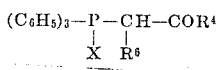

wherein $R^4$ signifies the same meaning as defined above; $R^6$ signifies hydrogen atom or a $C_1$–$C_3$ alkyl group; and X signifies a halogen atom, in an organic solvent selected from the group consisting of alcohols, N,N-dimethylformamide, dimethyl sulfoxide, benzene and diethyl ether at a temperature of 0° to 100° C. and in the presence of an alkali.

2. An o-anilinophenylpropionic acid derivative represented by the formula, wherein A' signifies an unsubstituted or $C_1$–$C_3$ alkyl substituted ethylene carbon chain; R, $R^1$, $R^2$ and $R^3$ signify respectively a hydrogen atom, a chlorine atom, a $C_1$–$C_3$ alkyl group, trifluoromethyl or a $C_1$–$C_3$ alkoxy group; and $R^4$ signifies a hydroxyl group or a $C_1$–$C_4$ alkoxy group.

3. β-{o-(2',3'-Xylidino)phenyl} propionic acid.
4. β-{o-(p'-Toluidino)phenyl} propionic acid.

* * * * *